(12) United States Patent
Jung et al.

(10) Patent No.: US 12,118,227 B1
(45) Date of Patent: Oct. 15, 2024

(54) STORAGE VOLUME ADDITION TO SYNCHRONIZED READ/WRITE ACCESSIBLE STORAGE SYSTEMS

(71) Applicant: Dell Products, L.P., Hopkinton, MA (US)

(72) Inventors: Jaeyoo Jung, Shrewsbury, MA (US); Ben Yoder, Chandler, AZ (US); Jeffrey Wilson, Franklin, MA (US)

(73) Assignee: Dell Products, L.P., Hopkinton, MA (US)

( * ) Notice: Subject to any disclaimer, the term of this patent is extended or adjusted under 35 U.S.C. 154(b) by 0 days.

(21) Appl. No.: 18/301,213

(22) Filed: Apr. 15, 2023

(51) Int. Cl.
*G06F 3/06* (2006.01)

(52) U.S. Cl.
CPC .......... *G06F 3/065* (2013.01); *G06F 3/0604* (2013.01); *G06F 3/0632* (2013.01); *G06F 3/067* (2013.01)

(58) Field of Classification Search
CPC ........ G06F 3/065; G06F 3/0604; G06F 3/067; G06F 3/0632
USPC ......................................................... 711/154
See application file for complete search history.

(56) References Cited

U.S. PATENT DOCUMENTS

2021/0240568 A1\* 8/2021 Srivastava .............. G06F 16/27
2022/0342548 A1\* 10/2022 Tylik ..................... G06F 3/0647

\* cited by examiner

*Primary Examiner* — Hua J Song
(74) *Attorney, Agent, or Firm* — Anderson Gorecki LLP

(57) ABSTRACT

Two storage arrays, a primary storage array and a remote storage array, are configured to implement a remote data replication facility, in which both the storage arrays are active, such that hosts can both read and write data to both the primary storage array and remote storage array. If the host would like to add storage, the host sends a command to one of the storage arrays to add a storage volume. The first storage array that receives the command locally creates the requested storage volume and coordinates with the second storage array to also locally create the requested storage volume. While the storage volumes are being created and formatted, the first and second storage arrays coordinate status responses to the host. Once the requested storage volumes is ready on both storage arrays, the storage volume is made accessible to the host on both storage arrays.

17 Claims, 8 Drawing Sheets

STORAGE VOLUME ADDITION TO SYNCHRONIZED READ/WRITE ACCESSIBLE STORAGE SYSTEMS

FIELD

This disclosure relates to computing systems and related devices and methods, and, more particularly, to a method and apparatus for enabling storage volume addition to synchronized read/write accessible storage systems implementing a remote data replication facility.

SUMMARY

The following Summary and the Abstract set forth at the end of this document are provided herein to introduce some concepts discussed in the Detailed Description below. The Summary and Abstract sections are not comprehensive and are not intended to delineate the scope of protectable subject matter, which is set forth by the claims presented below.

All examples and features mentioned below can be combined in any technically possible way.

In some embodiments, a method and apparatus for enabling storage volume addition to synchronized read/write accessible storage systems is provided. Two storage arrays, a primary R1 storage array and a remote R2 storage array, are configured to implement a remote data replication facility. Both the primary R1 storage array and remote R2 storage array are active, meaning that hosts can both read and write data to both the primary R1 storage array and remote R2 storage array, and can send control operations to both the primary R1 storage array and remote R2 storage array. The remote data replication facility causes data that is written to either of the storage arrays to be automatically synchronized on the remote data replication facility to the other storage array.

Multipathing software, for example native multipathing capabilities of the host operating system, causes IO operations on storage volumes managed by the storage arrays to be distributed between the primary R1 storage array and remote R2 storage array. As used herein, a storage array that receives an IO operation or a control operation from a host will be referred to as the "first" storage array, because that storage array is primarily responsible for responding to the particular IO operation or control operation. When the "first" storage array receives an IO operation or a control operation from the host, the other storage array on the remote data replication facility will be referred to as the "second" storage array. Depending on the type of interaction between the host and the first storage array, the second storage array may need to take particular actions in coordination with the first storage array. In some embodiments, the first storage array coordinates the actions of the second storage array in connection with responding to the host. Specifically, in some embodiments the first storage array is responsible for receiving the particular instruction from the host and responding to the particular instruction to the host, once the first storage array has implemented its own responsive actions and coordinated responsive actions by the second storage array.

It should be understood that, because both the primary R1 storage array and remote R2 storage array are both active, meaning that hosts can both read and write data to both of the primary R1 storage array and remote R2 storage array, and can issue control operations to both the primary R1 storage array and remote R2 storage array, either of the storage arrays may be the "first" storage array for a particular instruction. Specifically, in instances where a particular control operation is sent by the host to the primary R1 storage array, the primary R1 storage array is the "first" storage array and the remote R2 storage array is the "second" storage array for that particular control operation. Likewise, in instances where a particular control operation is sent by the host to the remote R2 storage array, the remote R2 storage array is the "first" storage array and the primary R1 storage array is the "second" storage array for that particular control operation. Whichever storage array thus first receives a control operation from the host is the "first" storage array, and the other storage array is controlled by the first storage array in connection with responding to the control operation and is the "second" storage array for purposes of that particular control operation.

Of interest to this disclosure, in some embodiments a host might want to add storage volumes, for example to add existing LUNs to an existing storage pool accessed by the host, to thereby obtain access to additional storage space. When a storage volume is to be added by the host to the remote data replication facility, the host sends a request to add the storage volume to either the primary R1 storage array or the remote R2 storage array. The storage array that receives the request to add the storage volume is the "first" storage array. In response to receipt of an instruction to create a storage volume, the first storage array creates the requested storage volume and begins operations to format the storage volume for use by the host. The first storage array also instructs the second storage array to create a storage volume. In response to the request to create the storage volume, the second storage array creates the requested storage volume on the second storage array and begins operations to format the storage volume on the second storage array for use by the host. Both the first storage array and the second storage array temporarily set the created storage volumes to be host inaccessible. The second storage array responds to the first storage array that the storage volume has been created and that formatting operations have started. Only after receipt of the response from the second storage array, does the first storage array respond to the host to indicate that creation of the storage volume has been initiated, and provides the host with an indication that the status of the storage volume is host inaccessible.

Once the primary R1 storage array and remote R2 storage array have begun the process of creating the requested storage volume, the host will periodically check the status of the storage volume using a Small Computer System Interface (SCSI) command referred to herein as "Test Unit Ready" (TUR). A TUR command may be issued to either the primary R1 storage array or to the remote R2 storage array, and is not limited to being issued to the same storage array that was the "first" storage array in connection with the previous create storage volume control operation. Whichever storage array (R1 or R2) receives the TUR control operation will be the "first" storage array in connection with that control operation and will coordinate with the "second" storage array prior to responding to the TUR control operation. In particular, the first storage array will send a request to the second storage array requesting the second array provide a percentage completed. Upon receiving a response from the second storage array, if one or both of the storage arrays has not completed formatting their respective storage volume, the first storage array will respond to the host with a SCSI sense code "Format In Progress" and a percentage completion value. If both the first and second storage arrays have completed formatting their respective storage volumes, the first storage array will respond to the host with a "Good" status for the storage volume. Once the host has received a "Good" status response to a TUR, the host can start using the newly created storage volumes on both the primary R1 storage array and remote R2 storage array.

In some embodiments, a method of enabling storage volume addition to a remote data replication facility, includes implementing the remote data replication facility between two storage arrays, the two storage arrays being synchronized and both storage arrays being read/write accessible to a host such that data written by the host to either of the storage arrays is synchronized on the remote data replication facility to the other of the storage arrays. The method includes receiving a request from the host, by a first of the storage arrays, to add a storage volume to the remote data replication facility, locally creating a first storage volume on the first storage array and setting the first storage volume to be host inaccessible, instructing a second of the storage arrays, by the first storage array, to add the storage volume to the remote data replication facility, and locally creating a second storage volume on the second storage array and setting the second storage volume to be host inaccessible. The method also includes formatting the first storage volume by the first storage array, formatting the second storage volume by the second storage array, and coordinating response to host status inquiries, by the first storage array and second storage array, to not respond with a storage volume status good indication to the host, until both formatting of the first storage volume has completed on the first storage array and formatting of the second storage volume has completed on the second storage array.

In some embodiments, the method further includes receiving a host storage volume status inquiry from the host by the first storage array, determining a first formatting percentage completion value of the first storage volume on the first storage array, transmitting a second storage volume status inquiry from the first storage array to the second storage array, determining a second formatting percentage completion value of the second storage volume on the second storage array, and responding to the second storage volume status inquiry with the second formatting percentage completion value by the second storage array to the first storage array. The method further includes creating a determined completion value, by the first storage array, from the first formatting percentage completion value and second formatting percentage completion value, and responding, by the first storage array to the host, with a host storage volume status inquiry response including the determined completion value. In some embodiments, the determined completion value is a lesser of the first formatting percentage completion value of the first storage volume and the second formatting percentage completion value of the second storage volume. In some embodiments, the determined completion value is an average of the first formatting percentage completion value of the first storage volume and the second formatting percentage completion value of the second storage volume. In some embodiments, the host storage volume status inquiry is a Small Computer System Interface (SCSI) Test Unit Ready command, and the host storage volume status inquiry response is a SCSI Format In Progress command.

In some embodiments, the method further includes receiving a host storage volume status inquiry from the host by the second storage array, determining a second formatting percentage completion value of the second storage volume on the second storage array, transmitting a second storage volume status inquiry from the second storage array to the first storage array, determining a first formatting percentage completion value of the first storage volume on the first storage array, and responding to the second storage volume status inquiry with the first formatting percentage completion value by the first storage array to the second storage array. The method further includes creating a determined completion value, by the second storage array, from the first formatting percentage completion value and second formatting percentage completion value, and responding, by the second storage array to the host, with a host storage volume status inquiry response including the determined completion value.

In some embodiments, the method further includes receiving a host storage volume status inquiry from the host by the first storage array, determining that formatting of the first storage volume has been completed on the first storage array, transmitting a storage volume status inquiry from the first storage array to the second storage array, determining that formatting of the second storage volume has been completed on the second storage array, responding to the storage volume status inquiry by the second storage array to the first storage array with an indication that formatting of the second storage volume has been completed on the second storage array, responding, by the first storage array to the host, with a host storage volume status inquiry response including a storage volume good status. In some embodiments, the method further includes setting the first storage volume to good status on the first storage array, and transmitting an instruction from the first storage array to the second storage array to set the status of the second storage volume to good status on the second storage array, prior to responding, by the first storage array to the host, with the host storage volume status inquiry response including the good storage volume status.

In some embodiments, the method further includes receiving a host storage volume status inquiry from the host by the second storage array, determining that formatting of the second storage volume has been completed on the second storage array, transmitting a storage volume status inquiry from the second storage array to the first storage array, determining that formatting of the first storage volume has been completed on the first storage array, responding to the storage volume status inquiry by the first storage array to the second storage array with an indication that formatting of the first storage volume has been completed on the first storage array, and responding, by the second storage array to the host, with a host storage volume status inquiry response including a storage volume good status. In some embodiments, the method further includes setting the second storage volume to good status on the second storage array, and transmitting an instruction from the second storage array to the first storage array to set the status of the first storage volume to good status on the first storage array, prior to responding, by the second storage array to the host, with the host storage volume status inquiry response including the good storage volume status.

In some embodiments, a synchronous remote data replication facility, includes a first storage array and a second storage array, the first and second storage arrays being synchronized and both the first and second storage arrays being read/write accessible to a host such that data written by the host to either of the first and second storage arrays is synchronized on the remote data replication facility to the other of the first and second storage arrays. Each of the first and second storage arrays including one or more processors and one or more storage devices storing instructions that are operable, when executed by the one or more processors, to cause the one or more processors to perform operations including receiving a request from the host, by the first storage array, to add a storage volume to the remote data replication facility, locally creating a first storage volume on the first storage array and setting the first storage volume to be host inaccessible, instructing the second storage array, by the first storage array, to add the storage volume to the remote data replication facility, and locally creating a second storage volume on the second storage array and setting the second storage volume to be host inaccessible. The operations further include formatting the first storage volume by the first storage array, formatting the second storage volume by the second storage array, and coordinating response to host status inquiries, by the first storage array and second storage array, to not respond with a storage volume status good indication to the host, until both formatting of the first storage volume has completed on the first storage array and formatting of the second storage volume has completed on the second storage array.

In some embodiments, the operations further include receiving a host storage volume status inquiry from the host by the first storage array, determining a first formatting percentage completion value of the first storage volume on the first storage array, transmitting a second storage volume status inquiry from the first storage array to the second storage array, determining a second formatting percentage completion value of the second storage volume on the second storage array, responding to the second storage volume status inquiry with the second formatting percentage completion value by the second storage array to the first storage array, creating a determined completion value, by the first storage array, from the first formatting percentage completion value and second formatting percentage completion value, and responding, by the first storage array to the host, with a host storage volume status inquiry response including the determined completion value.

In some embodiments, the determined completion value is a lesser of the first formatting percentage completion value of the first storage volume and the second formatting percentage completion value of the second storage volume. In some embodiments, the determined completion value is an average of the first formatting percentage completion value of the first storage volume and the second formatting percentage completion value of the second storage volume. In some embodiments, the host storage volume status inquiry is a Small Computer System Interface (SCSI) Test Unit Ready command, and the host storage volume status inquiry response is a SCSI Format In Progress command.

In some embodiments, the operations further include receiving a host storage volume status inquiry from the host by the second storage array, determining a second formatting percentage completion value of the second storage volume on the second storage array, transmitting a second storage volume status inquiry from the second storage array to the first storage array, determining a first formatting percentage completion value of the first storage volume on the first storage array, responding to the second storage volume status inquiry with the first formatting percentage completion value by the first storage array to the second storage array, creating a determined completion value, by the second storage array, from the first formatting percentage completion value and second formatting percentage completion value, and responding, by the second storage array to the host, with a host storage volume status inquiry response including the determined completion value.

In some embodiments, the operations further include receiving a host storage volume status inquiry from the host by the first storage array, determining that formatting of the first storage volume has been completed on the first storage array, transmitting a storage volume status inquiry from the first storage array to the second storage array, determining that formatting of the second storage volume has been completed on the second storage array, responding to the storage volume status inquiry by the second storage array to the first storage array with an indication that formatting of the second storage volume has been completed on the second storage array, and responding, by the first storage array to the host, with a host storage volume status inquiry response including a storage volume good status. In some embodiments, the operations further include setting the first storage volume to good status on the first storage array, and transmitting an instruction from the first storage array to the second storage array to set the status of the second storage volume to good status on the second storage array, prior to responding, by the first storage array to the host, with the host storage volume status inquiry response including the good storage volume status.

In some embodiments, the operations further include receiving a host storage volume status inquiry from the host by the second storage array, determining that formatting of the second storage volume has been completed on the second storage array, transmitting a storage volume status inquiry from the second storage array to the first storage array, determining that formatting of the first storage volume has been completed on the first storage array, responding to the storage volume status inquiry by the first storage array to the second storage array with an indication that formatting of the first storage volume has been completed on the first storage array, and responding, by the second storage array to the host, with a host storage volume status inquiry response including a storage volume good status. In some embodiments, the operations further include setting the second storage volume to good status on the second storage array, and transmitting an instruction from the second storage array to the first storage array to set the status of the first storage volume to good status on the first storage array, prior to responding, by the second storage array to the host, with the host storage volume status inquiry response including the good storage volume status.

DETAILED DESCRIPTION

Aspects of the inventive concepts will be described as being implemented in a storage system 100 connected to a host computer 102. Such implementations should not be viewed as limiting. Those of ordinary skill in the art will recognize that there are a wide variety of implementations of the inventive concepts in view of the teachings of the present disclosure.

Some aspects, features and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory tangible computer-readable medium. Furthermore, it will be understood by those of ordinary skill in the art that the computer-executable instructions may be executed on a variety of tangible processor devices, i.e., physical hardware. For ease of exposition, not every step, device or component that may be part of a computer or data storage system is described herein. Those of ordinary skill in the art will recognize such steps, devices, and components in view of the teachings of the present disclosure and the knowledge generally available to those of ordinary skill in the art. The corresponding machines and processes are therefore enabled and within the scope of the disclosure.

The terminology used in this disclosure is intended to be interpreted broadly within the limits of subject matter eligibility. The terms "logical" and "virtual" are used to refer to features that are abstractions of other features, e.g., and without limitation, abstractions of tangible features. The term "physical" is used to refer to tangible features, including but not limited to electronic hardware. For example, multiple virtual computing devices could operate simultaneously on one physical computing device. The term "logic" is used to refer to special purpose physical circuit elements, firmware, and/or software implemented by computer instructions that are stored on a non-transitory tangible computer-readable medium and implemented by multi-purpose tangible processors, and any combinations thereof.

Figure 1:
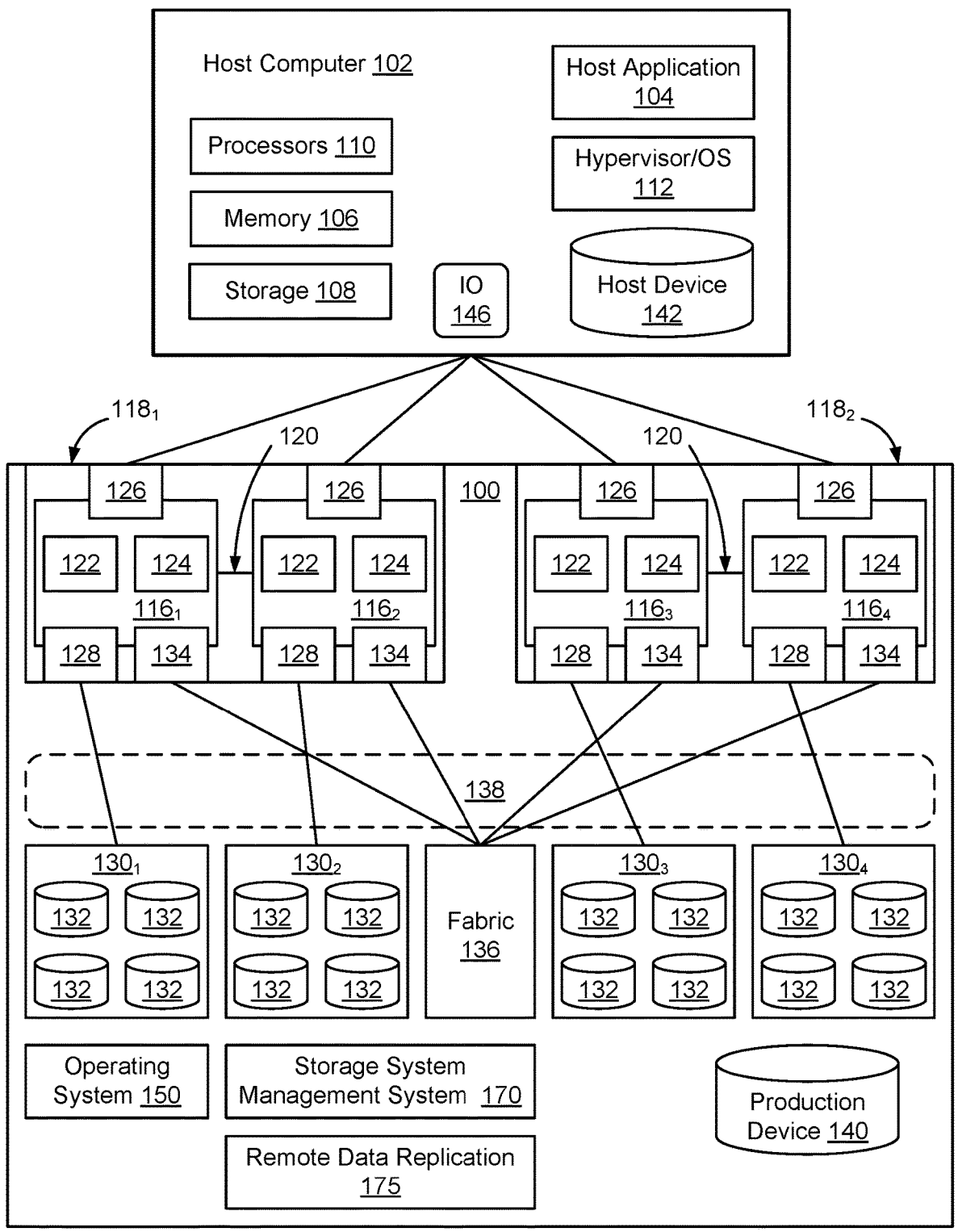
FIG. 1 is a functional block diagram of an example storage system connected to a host computer, according to some embodiments.

FIG. 1 illustrates a storage system 100 and an associated host computer 102, of which there may be many. The storage system 100 provides data storage services for a host application 104, of which there may be more than one instance and type running on the host computer 102. In the illustrated example, the host computer 102 is a server with host volatile memory 106, persistent storage 108, one or more tangible processors 110, and a hypervisor or OS (Operating System) 112. The processors 110 may include one or more multi-core processors that include multiple CPUs (Central Processing Units), GPUs (Graphics Processing Units), and combinations thereof. The host volatile memory 106 may include RAM (Random Access Memory) of any type. The persistent storage 108 may include tangible persistent storage components of one or more technology types, for example and without limitation SSDs (Solid State Drives) and HDDs (Hard Disk Drives) of any type, including but not limited to SCM (Storage Class Memory), EFDs (Enterprise Flash Drives), SATA (Serial Advanced Technology Attachment) drives, and FC (Fibre Channel) drives. The host computer 102 might support multiple virtual hosts running on virtual machines or containers. Although an external host computer 102 is illustrated in FIG. 1, in some embodiments host computer 102 may be implemented as a virtual machine within storage system 100.

The storage system 100 includes a plurality of compute nodes $116_1$-$116_4$, possibly including but not limited to storage servers and specially designed compute engines or storage directors for providing data storage services. In some embodiments, pairs of the compute nodes, e.g. ($116_1$-$116_2$) and ($116_3$-$116_4$), are organized as storage engines $118_1$ and $118_2$, respectively, for purposes of facilitating failover between compute nodes 116 within storage system 100. In some embodiments, the paired compute nodes 116 of each storage engine 118 are directly interconnected by communication links 120. In some embodiments, the communication links 120 are implemented as a PCIe NTB. As used herein, the term "storage engine" will refer to a storage engine, such as storage engines $118_1$ and $118_2$, which has a pair of (two independent) compute nodes, e.g. ($116_1$-$116_2$) or ($116_3$-$116_4$). A given storage engine 118 is implemented using a single physical enclosure and provides a logical separation between itself and other storage engines 118 of the storage system 100. A given storage system 100 may include one storage engine 118 or multiple storage engines 118.

Each compute node, $116_1$, $116_2$, $116_3$, $116_4$, includes processors 122 and a local volatile memory 124. The processors 122 may include a plurality of multi-core processors of one or more types, e.g., including multiple CPUs, GPUs, and combinations thereof. The local volatile memory 124 may include, for example and without limitation, any type of RAM. Each compute node 116 may also include one or more front-end adapters 126 for communicating with the host computer 102. Each compute node $116_1$-$116_4$ may also include one or more back-end adapters 128 for communicating with respective associated back-end drive arrays $130_1$-$130_4$, thereby enabling access to managed drives 132. A given storage system 100 may include one back-end drive array 130 or multiple back-end drive arrays 130.

In some embodiments, managed drives 132 are storage resources dedicated to providing data storage to storage system 100 or are shared between a set of storage systems 100. Managed drives 132 may be implemented using numerous types of memory technologies for example and without limitation any of the SSDs and HDDs mentioned above. In some embodiments the managed drives 132 are implemented using NVM (Non-Volatile Memory) media technologies, such as NAND-based flash, or higher-performing SCM (Storage Class Memory) media technologies such as 3D XPoint and ReRAM (Resistive RAM). Managed drives 132 may be directly connected to the compute nodes $116_1$-$116_4$, using a PCIe (Peripheral Component Interconnect Express) bus or may be connected to the compute nodes $116_1$-$116_4$, for example, by an IB (InfiniBand) bus or fabric.

In some embodiments, each compute node 116 also includes one or more channel adapters 134 for communicating with other compute nodes 116 directly or via an interconnecting fabric 136. An example interconnecting fabric 136 may be implemented using PCIe (Peripheral Component Interconnect Express) or InfiniBand. Each compute node 116 may allocate a portion or partition of its respective local volatile memory 124 to a virtual shared memory 138 that can be accessed by other compute nodes 116 over the PCIe NTB links.

The storage system 100 maintains data for the host applications 104 running on the host computer 102. For example, host application 104 may write data of host application 104 to the storage system 100 and read data of host application 104 from the storage system 100 in order to perform various functions. Examples of host applications 104 may include but are not limited to file servers, email servers, block servers, and databases.

Logical storage devices are created and presented to the host application 104 for storage of the host application 104 data. For example, as shown in FIG. 1, a production device 140 and a corresponding host device 142 are created to enable the storage system 100 to provide storage services to the host application 104.

The host device 142 is a local (to host computer 102) representation of the production device 140. Multiple host devices 142, associated with different host computers 102, may be local representations of the same production device 140. The host device 142 and the production device 140 are abstraction layers between the managed drives 132 and the host application 104. From the perspective of the host application 104, the host device 142 is a single data storage device having a set of contiguous fixed-size LBAs (Logical Block Addresses) on which data used by the host application 104 resides and can be stored. However, the data used by the host application 104 and the storage resources available for use by the host application 104 may actually be maintained by the compute nodes $116_1$-$116_4$ at non-contiguous addresses (tracks) on various different managed drives 132 on storage system 100.

In some embodiments, the storage system 100 maintains metadata that indicates, among various things, mappings between the production device 140 and the locations of extents of host application data in the virtual shared memory 138 and the managed drives 132. In response to an IO (Input/Output command) 146 from the host application 104 to the host device 142, the hypervisor/OS 112 determines whether the IO 146 can be serviced by accessing the host volatile memory 106. If that is not possible then the IO 146 is sent to one of the compute nodes 116 to be serviced by the storage system 100.

In the case where IO 146 is a read command, the storage system 100 uses metadata to locate the commanded data, e.g., in the virtual shared memory 138 or on managed drives 132. If the commanded data is not in the virtual shared memory 138, then the data is temporarily copied into the virtual shared memory 138 from the managed drives 132 and sent to the host application 104 by the front-end adapter 126 of one of the compute nodes $116_1$-$116_4$. In the case where the IO 146 is a write command, in some embodiments the storage system 100 copies a block being written into the virtual shared memory 138, marks the data as dirty, and creates new metadata that maps the address of the data on the production device 140 to a location to which the block is written on the managed drives 132.

Figure 2:
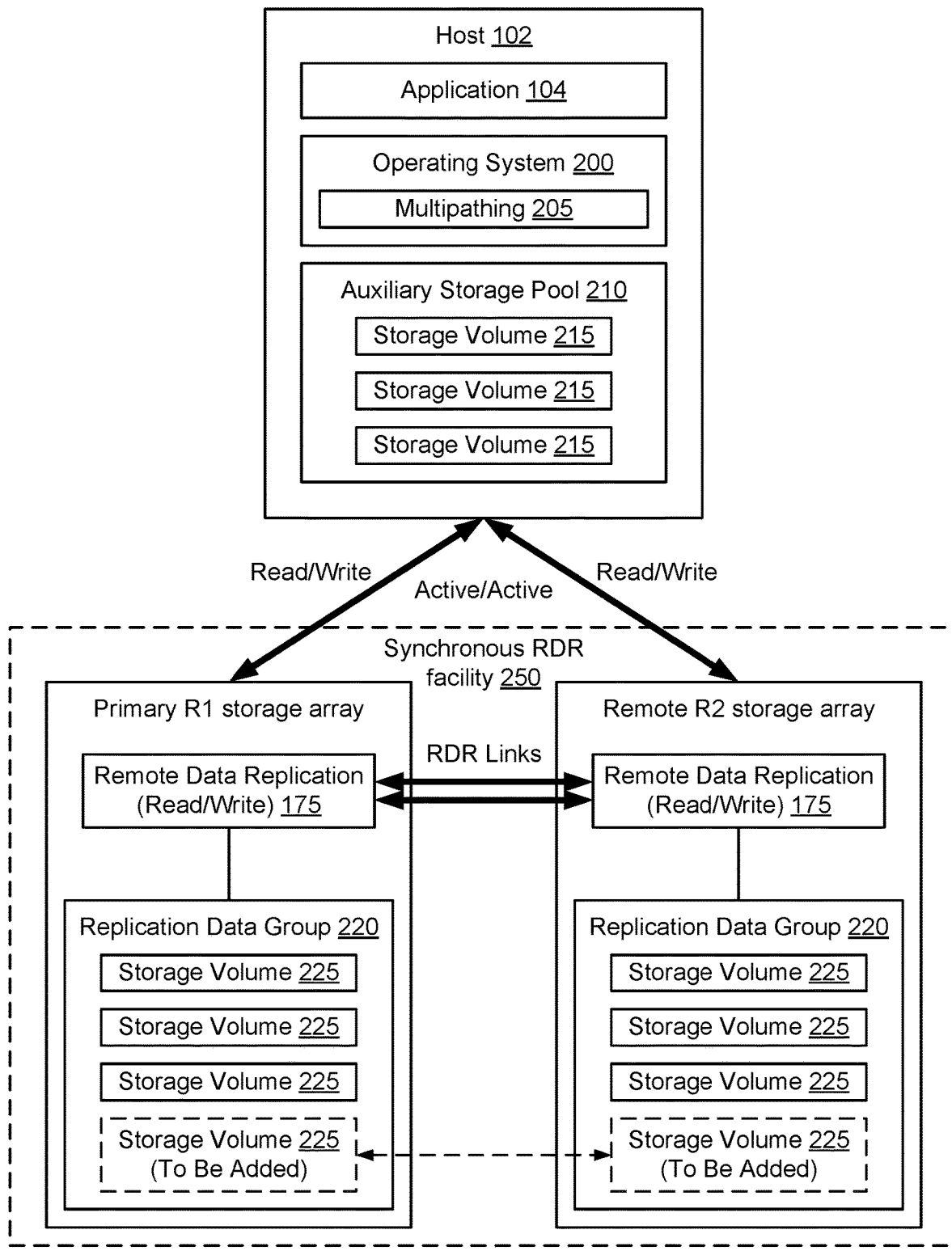
FIG. 2 is a functional block diagram an example pair of storage arrays implementing a synchronous remote data replication facility, in which both storage arrays are synchronized and both storage arrays are configured to respond to both read and write operations from the host computer, according to some embodiments.

FIG. 2 is a functional block diagram an example pair of storage arrays implementing a synchronous remote data replication facility, in which both storage arrays are synchronized and both storage arrays are configured to respond to both read and write operations from the host computer, according to some embodiments. As shown in FIG. 2, in some embodiments, a method and apparatus for enabling storage volume addition to synchronized read/write accessible storage systems is provided. Two storage arrays, a primary R1 storage array and a remote R2 storage array, are configured to implement a synchronous remote data replication facility 250 over Remote Data Replication (RDR) links. Both the primary R1 storage array and remote R2 storage array are active, meaning that hosts can both read and write data to both the primary R1 storage array and remote R2 storage array, and can send control operations to both the primary R1 storage array and remote R2 storage array. The synchronous remote data replication facility 250 is implemented by the remote data replication processes 175 on the primary R1 storage array and remote R2 storage array. The synchronous remote data replication facility 250 causes data that is written to storage volumes 225 of the remote data replication group 220, on either of the storage arrays, to be automatically synchronized with and also written to corresponding storage volumes 225 of the remote data replication group 220 via the remote data replication facility to the other storage array.

Multipathing software 205 on the host 102 causes IO operations on storage volumes 215 on the host (which correspond to storage volumes 225 on the storage arrays) to be distributed between the primary R1 storage array and remote R2 storage array. The multipathing software 205 may be separate software implemented as part of an IO stack at the host 102, or may be natively provided in the host operating system 200. By distributing IO operations to both the primary R1 storage array and remote R2 storage array, the host is able to obtain enhanced access to storage volumes 225.

As used herein, a storage array that receives an IO operation or a control operation from a host will be referred to as the "first" storage array, because that storage array is primarily responsible for responding to the particular IO operation or control operation. When the "first" storage array receives an IO operation or a control operation from the host, the other storage array on the remote data replication facility will be referred to as the "second" storage array. Depending on the type of interaction between the host and the first storage array, the second storage array may need to take particular actions in coordination with the first storage array. In some embodiments, the first storage array coordinates the actions of the second storage array in connection with responding to the host. Specifically, in some embodiments the first storage array is responsible for receiving the particular instruction from the host and responding to the particular instruction to the host, once the first storage array has implemented its own responsive actions and coordinated responsive actions by the second storage array.

It should be understood that, because both the primary R1 storage array and remote R2 storage array are both active, meaning that host 102 can both read and write data to both of the primary R1 storage array and remote R2 storage array, and can issue control operations to both the primary R1 storage array and remote R2 storage array, either of the storage arrays may be the "first" storage array for a particular interaction with the host. Specifically, in instances where a particular control operation is sent by the host to the primary R1 storage array, the primary R1 storage array is the "first" storage array and the remote R2 storage array is the "second" storage array for that particular control operation.

Likewise, in instances where a particular control operation is sent by the host to the remote R2 storage array, the remote R2 storage array is the "first" storage array and the primary R1 storage array is the "second" storage array for that particular control operation. Whichever storage array first receives a control operation from the host 102 is the "first" storage array, and the other storage array is controlled by the first storage array in connection with responding to the control operation, and is the "second" storage array for purposes of that particular control operation.

Of interest to this disclosure, in some embodiments a host might want to add one or more storage volumes 215, for example to add a LUN to an auxiliary storage pool 210 accessed by the host 102, to thereby obtain access to additional storage space. When a storage volume 215 is to be added by the host 102 to the auxiliary storage pool 210, addition of the storage volume 215 requires corresponding storage volumes 225 to be created by each of the storage arrays implementing the remote data replication facility 250.

Accordingly, in some embodiments, the host 102 sends a request to add a storage volume 225 to either the primary R1 storage array or the remote R2 storage array. The storage array that receives the request to add the storage volume 225 is the "first" storage array. In response to receipt of an instruction to create a storage volume 225, the first storage array creates the requested storage volume 225 and begins operations to format the storage volume 225 for use by the host. The first storage array also instructs the second storage array to create a corresponding storage volume 225. In response to the request to create the storage volume 225, the second storage array creates the requested storage volume 225 on the second storage array and begins operations to format the storage volume 225 on the second storage array for use by the host 102. Both the first storage array and the second storage array temporarily set the created storage volumes 225 to be host inaccessible. The second storage array responds to the first storage array that the storage volume 225 has been created and that formatting operations have started. Only after receipt of the response from the second storage array, does the first storage array respond to the host 102 to indicate that creation of the storage volume 225 has been initiated, and provides the host 102 with an indication that the status of the storage volume is host inaccessible.

Once the primary R1 storage array and remote R2 storage array have begun the process of creating the requested storage volume 225, the host 102 will periodically check the status of the storage volume 225 using a SCSI command referred to herein as "Test Unit Ready" (TUR). A TUR command may be issued to either the primary R1 storage array or to the remote R2 storage array, and is not limited to being issued to the same storage array that was the "first" storage array in connection with the previous create storage volume control operation.

Whichever storage array (R1 or R2) receives the TUR control operation from the host 102 will be the "first" storage array in connection with that control operation, and will coordinate with the "second" storage array prior to sending a message to the host in response to the TUR control operation. In particular, the first storage array will send a request to the second storage array requesting that the second array provide an update on creation of the storage volume 225 and specify a percentage format completed. Upon receiving a response from the second storage array, if one or both of the storage arrays has not completed formatting their respective storage volume 225, the first storage array will respond to the host 102 with a SCSI sense code "Format In Progress" and a percentage completion value. If both the first and second storage arrays have completed formatting their respective storage volumes 225, the first storage array will respond to the host with a "Good" status for the storage volume. Once the host has received a "Good" status response to a TUR, the host can start using the newly created storage volumes on both the primary R1 storage array and remote R2 storage array.

Figure 3:
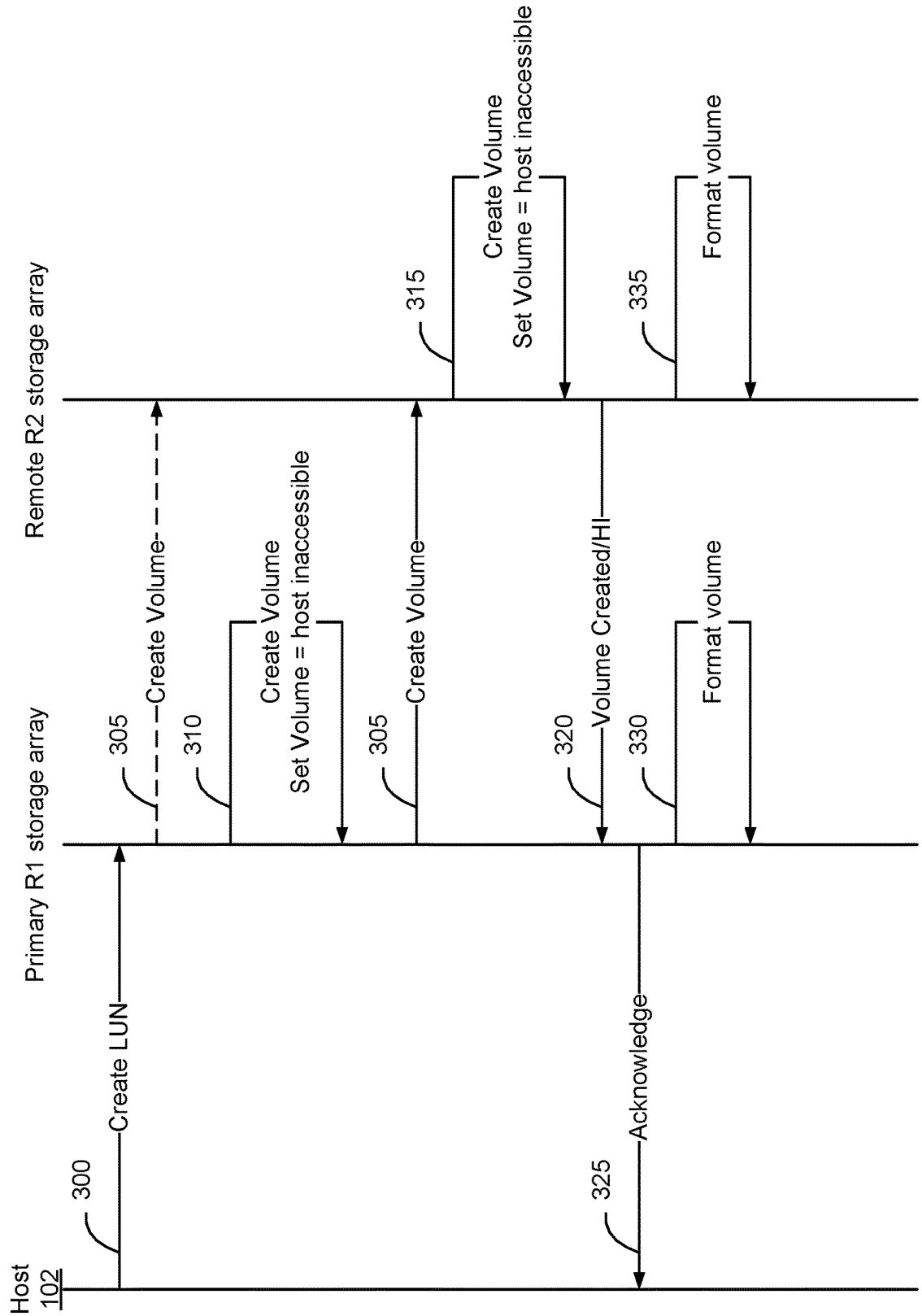
FIG. 3 is a swim lane diagram illustrating an example process of initiating addition of a storage volume to a remote data replication facility implemented using synchronized read/write accessible storage arrays, according to some embodiments.

FIG. 3 is a swim lane diagram illustrating an example process of initiating addition of a storage volume 225 to a remote data replication facility 250 implemented using synchronized read/write accessible storage arrays, according to some embodiments. In the example shown in FIG. 3, it is assumed that the primary R1 storage array is the "first" storage array, and that the host 102 instructs the primary R1 storage array to create a storage volume 225. A storage volume 225 is also referred to herein as a Logical Unit Number (LUN). Although not shown in FIG. 3, the same process may be implemented where the remote R2 storage array is the "first" storage array and the primary R1 storage array is the "second" storage array.

As shown in FIG. 3, when the host 102 would like to add an existing LUN to the host's auxiliary storage pool, for example to obtain access to additional storage space, the host sends a SCSI instruction referred to herein as "Create LUN" (arrow 300) to one of the storage arrays. In FIG. 3, the swim-lane diagram shows this instruction as being received by the primary R1 storage array.

When the first storage array receives the create LUN instruction (arrow 300), both the first storage array and the second storage array need to create a storage volume 225 and need to temporarily set the storage volume 225 to be host inaccessible while the storage volumes 225 are being formatted on both the first and second storage arrays. Accordingly, as shown in FIG. 3, the primary R1 storage array creates a storage volume 225 (arrow 310) and sets the storage volume 225 to be host inaccessible. The primary R1 storage array also sends an instruction (arrow 305) to the remote R2 storage array to instruct the remote R2 storage array to also create a storage volume 225 and set the storage volume 225 to be host inaccessible (arrow 315). As shown in FIG. 3, the timing of when the instruction (arrow 305) is sent to the remote R2 storage array may vary relative to creation of the storage volume 225 by the primary R1 storage array, depending on the implementation. For example, the primary R1 storage array might send the instruction (dashed arrow 305) prior to locally creating the storage volume (arrow 310), simultaneous with locally creating the storage volume 225, or might send the instruction (solid arrow 305) after locally creating the storage volume 225 (arrow 310).

The host R2 storage array then sends an acknowledgement (arrow 320) to the primary R1 storage array that the storage volume has been created and has set to be host inaccessible (arrow 315). Once the primary R1 storage array has created the storage volume 225 and set the storage volume 225 to be host inaccessible (arrow 310) and has received an acknowledgement that the same process has been implemented on the remote R2 storage array (arrow 320), the primary R1 storage array acknowledges the request to the host 102 (arrow 325). Both the primary R1 storage array and the remote R2 storage array also begin the process of formatting the storage volume 225 for use by the host 102 (arrows 330 and 335 respectively). Although FIG. 3 shows the formatting process starting after the acknowledgment process, the primary R1 and remote R2 storage arrays can start formatting the storage volumes immediately upon creation, depending on the implementation.

Figure 4:
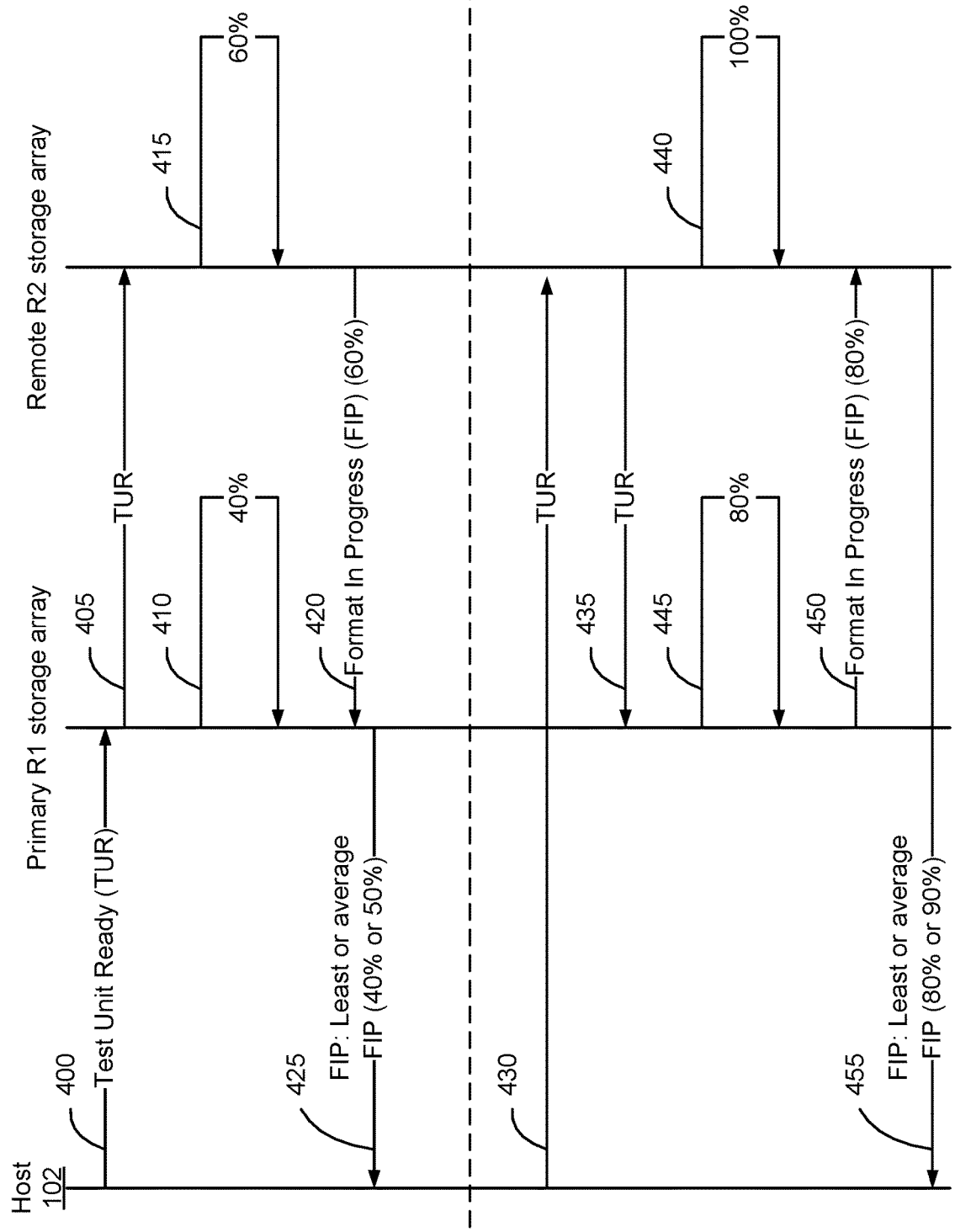
FIG. 4 is a swim lane diagram illustrating an example process of responding to host-initiated progress requests associated with addition of a storage volume to a remote data replication facility implemented using synchronized read/write accessible storage arrays, according to some embodiments.

FIG. 4 is a swim lane diagram illustrating an example process of responding to host-initiated progress requests associated with addition of a storage volume 225 to a remote data replication facility 250 implemented using synchronized read/write accessible storage arrays, according to some embodiments. FIG. 4 shows two examples of how the primary R1 and remote R2 storage arrays can respond to Test Unit Ready SCSI commands from the host, depending on whether the TUR is received by the primary R1 storage array (arrows 400-425) or whether the TUR is received by the remote R2 storage array (arrows 430-455). Arrows 400-425 correspond to a situation where the primary R1 storage array is the "first" storage array, and arrows 430-455 correspond to a situation where the remote R2 storage array is the "first" storage array. The collective response of the two storage arrays is the same in both instances.

As shown in FIG. 4, if the primary R1 storage array receives a SCSI command "Test Unit Ready" (TUR) from the host 102 (arrow 400) the primary R1 storage array is the "first" storage array and sends a corresponding TUR command to the remote R2 storage array (arrow 405). In response to receipt of the TUR from the host 102 (arrow 400), the primary R1 storage array also determines the percentage format completion of the storage volume 225 that is being created for the host 102 (arrow 410). In response to receipt of the TUR from the primary R1 storage array (arrow 405), the remote R2 storage array determines the percentage format completion of the storage volume 225 that is being created for the host 102 (arrow 415). The remote R2 storage array then returns a SCSI command "Format In Progress" with a percentage format completed indication (arrow 420). In the example shown in FIG. 4, it is assumed that the primary storage array has determined that it is 40% complete formatting the requested storage volume 225 (arrow 410), and that the remote R2 storage array has determined that it is 60% complete formatting the requested storage volume 225 (arrow 420).

Once the primary R1 storage array receives the response from the remote R2 storage array (arrow 420), the primary R1 storage array determines a combined percentage completion value, and responds to the host 102 with a SCSI command "Format In Progress" with the determined completion value (arrow 425).

In some embodiments, the determined completion value is the lesser of the percentage completion of the primary R1 storage array or the percentage completion of the remote R2 storage array. For example, using the values shown in FIG. 4, where the two percentage completion values are 40% and 60%, the lesser percentage completion value is 40% and, accordingly, in some embodiments the primary R1 storage array would return the determined percentage completion value of 40% to the host 102 in arrow 425.

In some embodiments, the determined completion value is the average percentage completion value calculated as the average of the percentage completion of the primary R1 storage array and the percentage completion of the remote R2 storage array. For example, using the values shown in FIG. 4, where the two percentage completion values are 40% and 60%, the average percentage completion value is (40%+60%)/2=50%. Accordingly, in some embodiments the primary R1 storage array would return the determined percentage completion value of 50% to the host 102 in arrow 425. In some embodiments, the determined percentage completion value is configured to never reduce over time, such that the host 102 only sees an increasing determined percentage completion values in response to successive TUR commands issued on the primary R1 and remote R2 storage arrays.

The same process is implemented if the host 102 first sends a TUR (arrow 430) to the remote R2 storage array rather than to the primary R1 storage array (arrow 400). Specifically, as shown in FIG. 4, if the host 102 sends the TUR to the remote R2 storage array (arrow 430), the remote R2 storage array is the "first" storage array in connection with responding to that TUR, and sends a corresponding TUR (arrow 435) to the primary R1 storage array. Both the primary R1 and the remote R2 determine the percentage completion (arrows 445 and 440, respectively), and when the remote R2 receives the TUR with the % completion from the primary R1 storage array (arrow 450), the remote R2 storage array calculates a determined completion value and responds to the host 102 with a FIP (arrow 455) that includes the determined completion value. In the lower section of FIG. 4, the percentage completion values of the primary R1 and remote R2 storage arrays are 80% and 100%, respectively, and accordingly the determined completion value is calculated as either the lesser percentage (80%) or the average percentage completion (90%), depending on the implementation.

By calculating a determined FIP value, as described herein, the host 102 will be provided with an increasing percentage completion value by both the primary R1 and remote R2 storage arrays regardless of which storage array receives the test unit ready command from the host 102 (arrow 400, 430). For example, if each storage array simply responded with their own % completion, the host 102 would get different values from the remote R2 storage array and primary R1 storage array, which could cause the effective completion to appear to the host to be decreasing rather than increasing. By causing the "first" storage array to calculate a determined completion value from the combined completion values of both the first and second storage arrays, and report the determined completion value to the host 102, this situation can be avoided since the average % completion value or the least completion % value would be expected to be a continuously increasing value over time.

Figure 5:
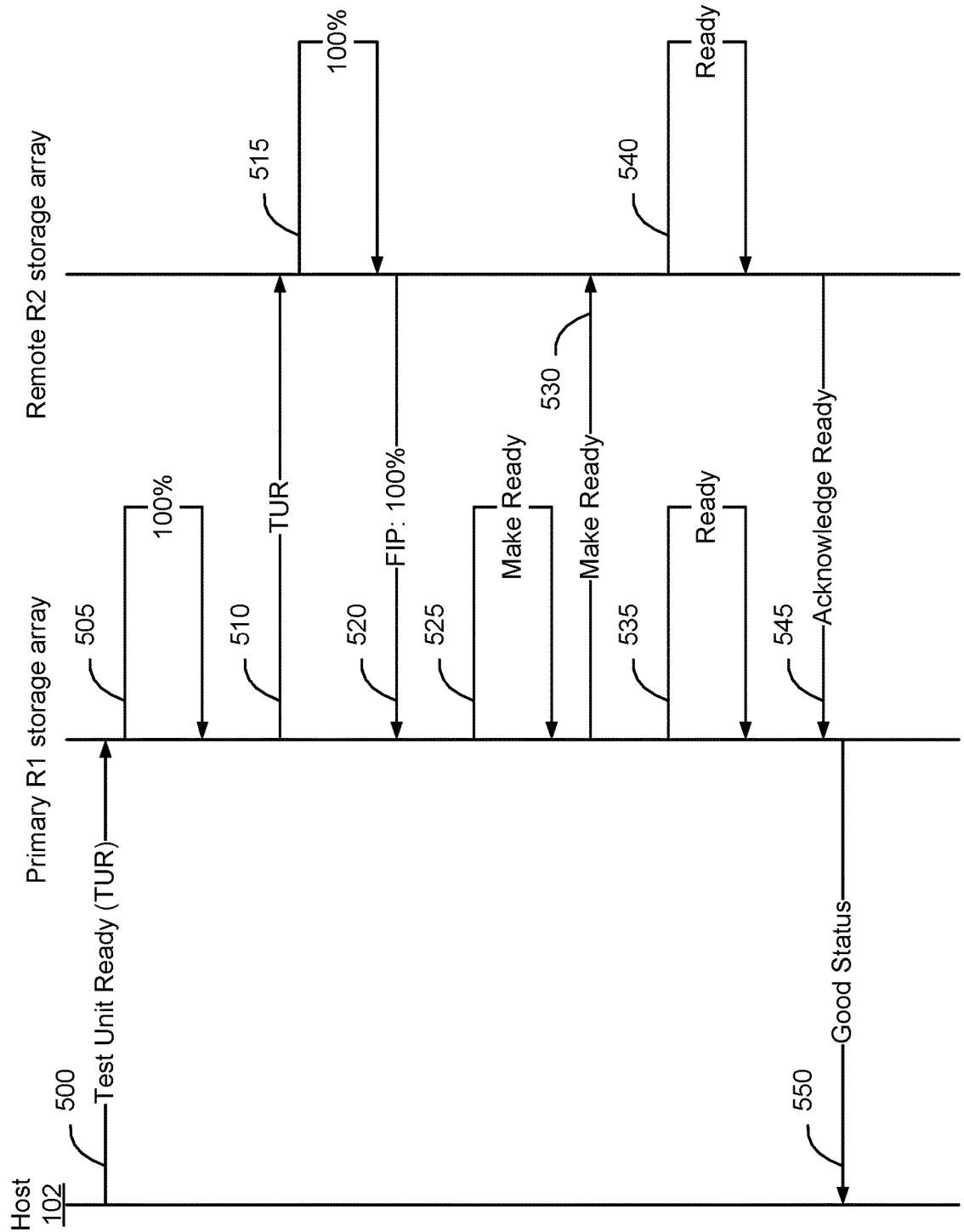
FIG. 5 is a swim lane diagram illustrating an example process of simultaneous activation of an added storage volume on both storage arrays of a remote data replication facility implemented using synchronized read/write accessible storage arrays, according to some embodiments.

FIG. 5 is a swim lane diagram illustrating an example process of simultaneous activation of an added storage volume 225 on both storage arrays of a remote data replication facility 250 implemented using synchronized read/write accessible storage arrays, according to some embodiments. In FIG. 5 it is assumed that the SCSI Test Unit Ready (TUR) command is received by the primary R1 storage array and, accordingly, the primary R1 storage array is the "first" storage array in FIG. 5. The SCSI TUR command may similarly be received by the remote R2 storage array, in which case remote R2 storage array would be the "first" storage array and the primary R1 storage array would be the "second" storage array.

As shown in FIG. 5, the host 102 sends a SCSI Test Unit Read (TUR) command (arrow 500). In response, the storage array that receives the TUR command (primary R1 storage array in FIG. 5) determines that the storage volume formatting process is at 100% (arrow 505). The primary R1 storage array also sends a TUR command to the remote R2 storage array or another type of proprietary message, depending on the implementation (arrow 510). In response, the remote R2 storage array determines that the storage volume formatting process is at 100% (arrow 515). Accordingly, the remote R2 storage array returns a SCSI Format in Progress command with a percentage complete set to 100% (arrow 520).

In response to a determination that both the primary R1 storage array and remote R2 storage arrays have completed the formatting operations on the storage volume 225, both storage arrays are ready to make the storage volume 225 ready for access by the host 102. Accordingly, in some embodiments, the primary R1 storage array starts the process of making the storage volume 225 ready locally (arrow 525) and sends an instruction to the remote R2 storage array to make the storage volume 225 ready (arrow 530). Both the primary R1 storage array and the remote R2 storage array make the storage volume 225 ready (arrows 535, 540, respectively). When the storage volume 225 is ready on the remote R2 storage array, the remote R2 storage array acknowledges the ready request (arrow 545). After receipt of the response from the remote R2 storage array (receipt of arrow 545), and once the storage array has been made ready on the primary R1 storage array (completion of arrow 535), the primary R1 storage array then acknowledges the TUR with a "good status" (arrow 550), which is the signal to the host 102 that the host 102 is able to start using the storage volumes 225 on the primary R1 storage array and remote R2 storage array.

Figure 6:
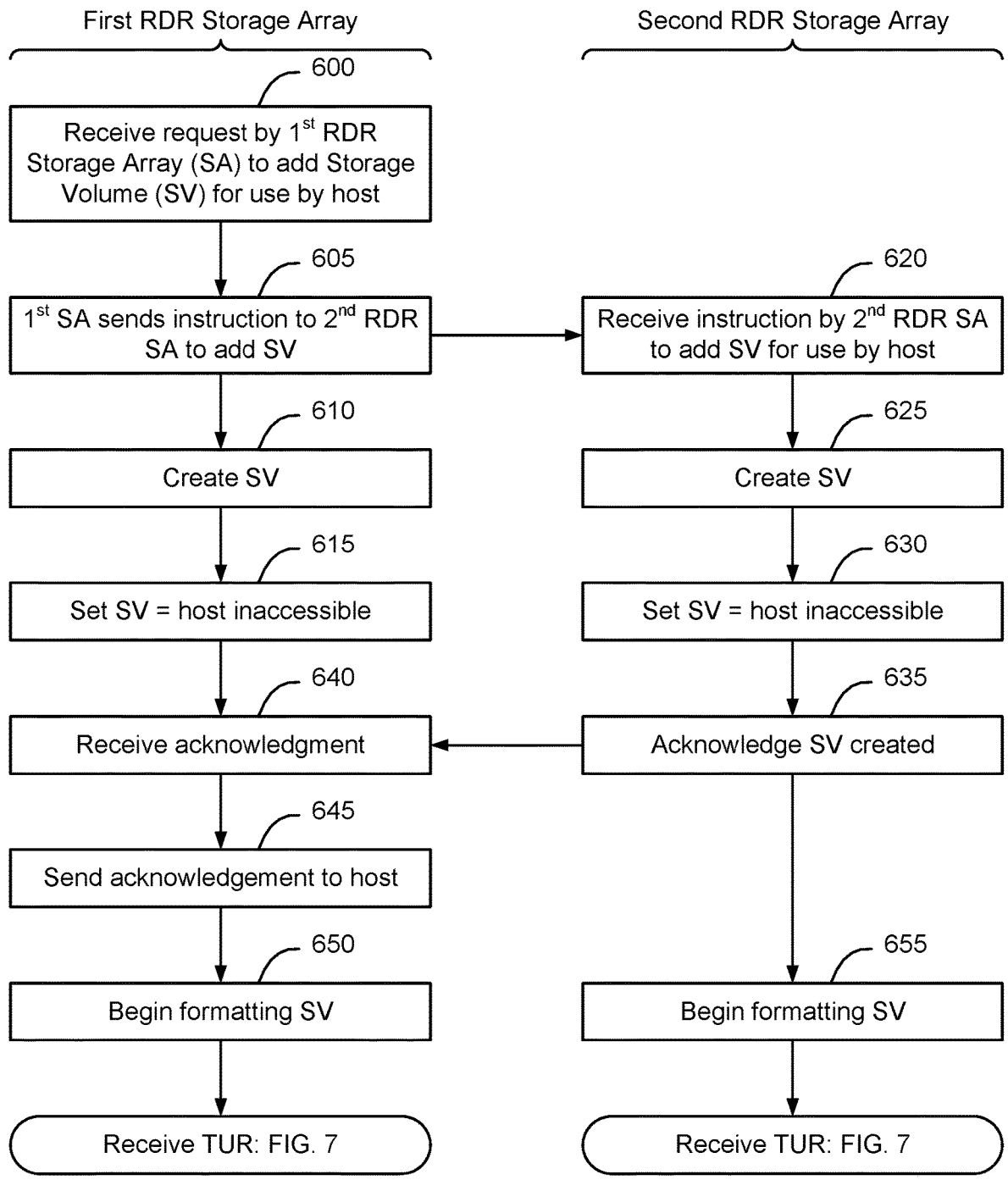
FIG. 6 is a flow chart of an example process of initiating addition of a storage volume to a remote data replication facility implemented using synchronized read/write accessible storage arrays, according to some embodiments.
Figure 7:
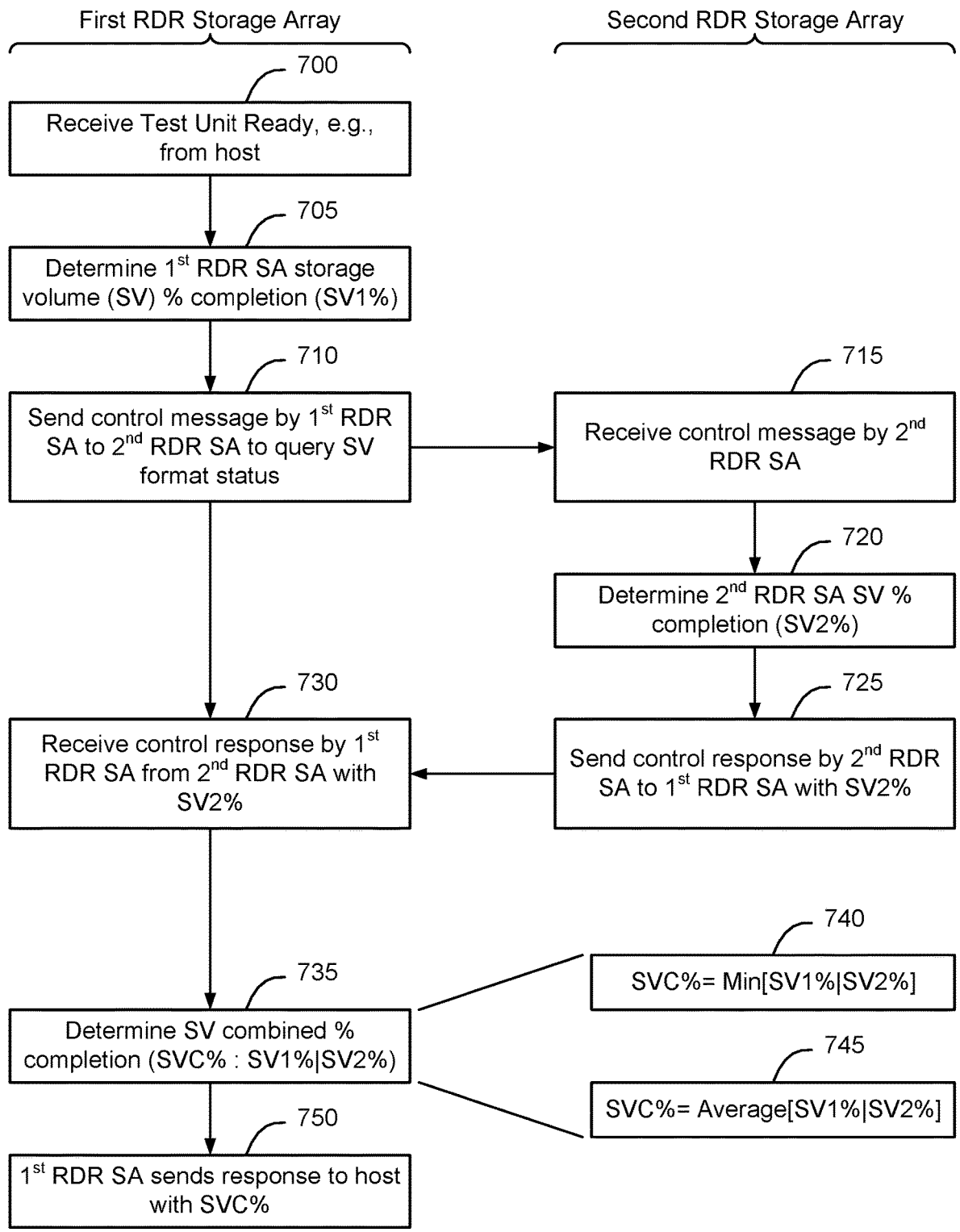
FIG. 7 is a flow chart of an example process of responding to host-initiated progress requests associated with addition of a storage volume to a remote data replication facility implemented using synchronized read/write accessible storage arrays, according to some embodiments.
Figure 8:
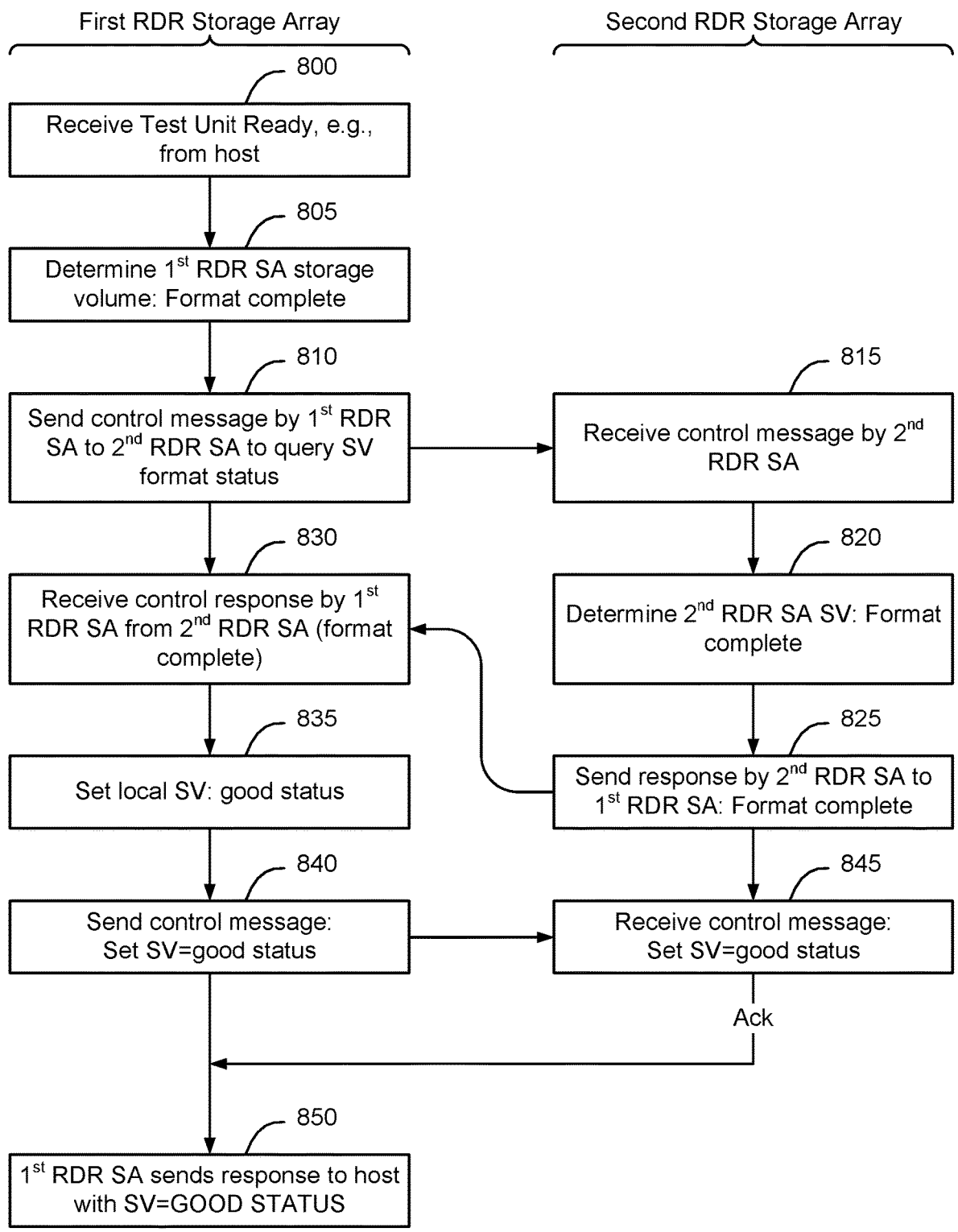
FIG. 8 is a flow chart of an example process of simultaneous activation of an added storage volume on both storage arrays of a remote data replication facility implemented using synchronized read/write accessible storage arrays, according to some embodiments.

FIG. 6 is a flow chart of an example process of initiating addition of a storage volume 225 to a remote data replication facility 250 implemented using synchronized read/write accessible storage arrays, according to some embodiments. FIGS. 6-8 show operations implemented by the "first" storage array which, as noted herein, is the storage array that receives a request from the host 102. The "second" storage array is the other storage array on the remote data replication facility. Different storage arrays may be the respective first storage array in each of FIGS. 6-8, depending on which storage array receives the SCSI command associated with the particular figure from the host 102.

As shown in FIG. 6, in some embodiments the first Remote Data Replication (RDR) storage array receives a request to add a storage volume 225 for use by a host 102 (block 600). The first RDR storage array sends an instruction to the second RDR storage array to add the storage volume 225 (block 605). The first RDR storage array locally creates the storage volume 225 (block 610), sets the storage volume 225 to be host inaccessible (block 615) and waits to receive an acknowledgment from the second RDR storage array. The second RDR storage array receives the instruction to create the storage volume 225 for use by the host 102 (block 620), locally creates the storage volume 225 (block 625), sets the storage volume 225 to be host 102 inaccessible (block 630) and sends an acknowledgment back to the first RDR storage array (block 635).

When the first RDR storage array receives the acknowledgment from the second RDR storage array (block 640), the first RDR storage array sends an acknowledgment to the host 102 (block 645). After creating the storage volume 225 and setting the storage volume 225 to be host 102 inaccessible, both the first RDR storage array and the second RDR storage array begin formatting the storage volume 225 (blocks 650 and 655 respectively). While FIG. 6 shows the first and second RDR storage arrays beginning to format the storage volume 225 only after the acknowledgment processes (blocks 635, 640, 645), it should be understood that formatting can begin earlier in the process, for example directly after creation of the storage volumes (directly after blocks 610 and 625 respectively), and before completion of the acknowledgment processes.

FIG. 7 is a flow chart of an example process of responding to host-initiated progress requests associated with addition of a storage volume 225 to a remote data replication facility 250 implemented using synchronized read/write accessible storage arrays, according to some embodiments. In some embodiments, the host-initiated progress requests are SCSI Test Unit Ready (TUR) commands, although other host-initiated progress requests may be utilized as well depending on the implementation.

As shown in FIG. 7, optionally after the storage volume formatting has begun, and prior to the storage volume formatting has been completed, the host 102 may send a SCSI Test Unit Ready (TUR) command to a first RDR storage array (block 700). In response to receipt of a TUR command, the first RDR storage array determines the percentage completion value of the storage volume 225 on the first RDR storage array (block 705). The first RDR storage array also sends a control message to the second RDR storage array to query the storage volume 225 format status (block 710).

The second RDR storage array receives the control message from the first RDR storage array (block 715), determines the percentage completion of the storage volume formatting on the second RDR storage array (block 720) and sends a control response message to the first RDR storage array with an indication of the percentage completion (block 725).

When the first RDR storage array receives the control response with the percentage completion (block 730), the first RDR storage array determines the storage volume 225 (SV) combined completion value (block 735). As described in greater detain herein, in some embodiments the determined SV combined completion value is the lesser of the two completion values (the lesser of the % completion determined in block 705 and the % completion determined in block 720) (block 740). In some embodiments, the determined storage value combined completion value is the average of the two completion values (the average of the % completion determined in block 705 and the % completion determined in block 720) (block 745). The first RDR storage array then responds to the host 102 with the determined storage volume combined percentage completion value (block 750).

FIG. 8 is a flow chart of an example process of simultaneous activation of an added storage volume 225 on both storage arrays of a remote data replication facility 250 implemented using synchronized read/write accessible storage arrays, according to some embodiments. As shown in FIG. 8, when a first RDR storage array receives a SCSI Test Unit Ready command from the host 102 (block 800), the first RDR storage array will check the storage volume format progress, and determine that the format process has locally completed (block 805). The first RDR storage array also sends a control message to the second RDR storage array to query the storage volume format status (block 810).

The second RDR storage array receives the control message from the first RDR storage array (block 815), and determines that the format process has locally completed (block 820). The second RDR storage array sends a control response message to the first RDR storage array with an indication that the format process has completed on the second RDR storage array (block 825).

The first RDR storage receives the control response with format complete indication (block 830), the first RDR storage array sets the storage volume status to "good status" (block 835). The first RDR storage array also sends an instruction to the second RDR storage array to set the status of the storage volume 225 to "good status" (block 840). The second storage array receives the instruction to set the status of the storage volume 225 to good (block 845), sets the status of the storage volume 225 to good status, and sends an acknowledgement to the first RDR storage array (Ack arrow). In response to the acknowledgment, the first storage array sends a response to the host TUR with storage volume 225="good status" (block 850). When the host 102 receives a response that the storage volume 225 has a "good status" the host 102 is able to start issuing read and write IO operations on the newly created storage volume 225.

The methods described herein may be implemented as software configured to be executed in control logic such as contained in a CPU (Central Processing Unit) or GPU (Graphics Processing Unit) of an electronic device such as a computer. In particular, the functions described herein may be implemented as sets of program instructions stored on a non-transitory tangible computer readable storage medium. The program instructions may be implemented utilizing programming techniques known to those of ordinary skill in the art. Program instructions may be stored in a computer readable memory within the computer or loaded onto the computer and executed on computer's microprocessor. However, it will be apparent to a skilled artisan that all logic described herein can be embodied using discrete components, integrated circuitry, programmable logic used in conjunction with a programmable logic device such as a FPGA (Field Programmable Gate Array) or microprocessor, or any other device including any combination thereof. Programmable logic can be fixed temporarily or permanently in a tangible non-transitory computer readable medium such as random-access memory, a computer memory, a disk drive, or other storage medium. All such embodiments are intended to fall within the scope of the present invention.

Throughout the entirety of the present disclosure, use of the articles "a" or "an" to modify a noun may be understood to be used for convenience and to include one, or more than one of the modified noun, unless otherwise specifically stated. The term "about" is used to indicate that a value includes the standard level of error for the device or method being employed to determine the value. The use of the term "or" in the claims is used to mean "and/or" unless explicitly indicated to refer to alternatives only or the alternatives are mutually exclusive, although the disclosure supports a definition that refers to only alternatives and to "and/or." The terms "comprise," "have" and "include" are open-ended linking verbs. Any forms or tenses of one or more of these verbs, such as "comprises," "comprising," "has," "having," "includes" and "including," are also open-ended. For example, any method that "comprises," "has" or "includes" one or more steps is not limited to possessing only those one or more steps and also covers other unlisted steps.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method of enabling storage volume addition to a remote data replication facility, comprising:
    implementing the remote data replication facility between two storage arrays, the two storage arrays being synchronized and both storage arrays being read/write accessible to a host such that data written by the host to either of the storage arrays is synchronized on the remote data replication facility to the other of the storage arrays;
    receiving a request from the host, by a first of the storage arrays, to add a storage volume to the remote data replication facility;
    locally creating a first storage volume on the first storage array and setting the first storage volume to be host inaccessible;
    instructing a second of the storage arrays, by the first storage array, to add the storage volume to the remote data replication facility;
    locally creating a second storage volume on the second storage array and setting the second storage volume to be host inaccessible;
    formatting the first storage volume by the first storage array;
    formatting the second storage volume by the second storage array;
    coordinating response to host status inquiries, by the first storage array and second storage array, to not respond with a storage volume status good indication to the host, until both formatting of the first storage volume has completed on the first storage array and formatting of the second storage volume has completed on the second storage array;
    receiving a first host storage volume status inquiry from the host by the first storage array;
    determining a first formatting percentage completion value of the first storage volume on the first storage array;
    transmitting a first storage volume status inquiry from the first storage array to the second storage array;
    determining a second formatting percentage completion value of the second storage volume on the second storage array;
    responding to the first storage volume status inquiry with the second formatting percentage completion value by the second storage array to the first storage array;
    creating a determined completion value, by the first storage array, from the first formatting percentage completion value and second formatting percentage completion value; and
    responding, by the first storage array to the host, with a first host storage volume status inquiry response including the determined completion value.

2. The method of claim 1, wherein the determined completion value is a lesser of the first formatting percentage completion value of the first storage volume and the second formatting percentage completion value of the second storage volume.

3. The method of claim 1, wherein the determined completion value is an average of the first formatting percentage completion value of the first storage volume and the second formatting percentage completion value of the second storage volume.

4. The method of claim 1, wherein the first host storage volume status inquiry is a Small Computer System Interface (SCSI) Test Unit Ready command, and wherein the first host storage volume status inquiry response is a SCSI Format In Progress command.

5. The method of claim 1, further comprising:
receiving a second host storage volume status inquiry from the host by the first storage array;
determining that formatting of the first storage volume has been completed on the first storage array;
transmitting a second storage volume status inquiry from the first storage array to the second storage array;
determining that formatting of the second storage volume has been completed on the second storage array;
responding to the second storage volume status inquiry by the second storage array to the first storage array with an indication that formatting of the second storage volume has been completed on the second storage array; and
responding, by the first storage array to the host, with a second host storage volume status inquiry response including a storage volume good status.

6. The method of claim 5, further comprising setting the first storage volume to good status on the first storage array, and transmitting an instruction from the first storage array to the second storage array to set the status of the second storage volume to good status on the second storage array, prior to responding, by the first storage array to the host, with the second host storage volume status inquiry response including the good storage volume status.

7. A method of enabling storage volume addition to a remote data replication facility, comprising:
implementing the remote data replication facility between two storage arrays, the two storage arrays being synchronized and both storage arrays being read/write accessible to a host such that data written by the host to either of the storage arrays is synchronized on the remote data replication facility to the other of the storage arrays;
receiving a request from the host, by a first of the storage arrays, to add a storage volume to the remote data replication facility;
locally creating a first storage volume on the first storage array and setting the first storage volume to be host inaccessible;
instructing a second of the storage arrays, by the first storage array, to add the storage volume to the remote data replication facility;
locally creating a second storage volume on the second storage array and setting the second storage volume to be host inaccessible;
formatting the first storage volume by the first storage array;
formatting the second storage volume by the second storage array;
coordinating response to host status inquiries, by the first storage array and second storage array, to not respond with a storage volume status good indication to the host, until both formatting of the first storage volume has completed on the first storage array and formatting of the second storage volume has completed on the second storage array;
receiving a host storage volume status inquiry from the host by the second storage array;
determining that formatting of the second storage volume has been completed on the second storage array;
transmitting a storage volume status inquiry from the second storage array to the first storage array;
determining that formatting of the first storage volume has been completed on the first storage array;
responding to the storage volume status inquiry by the first storage array to the second storage array with an indication that formatting of the first storage volume has been completed on the first storage array; and
responding, by the second storage array to the host, with a host storage volume status inquiry response including a storage volume good status.

8. The method of claim 7, further comprising setting the second storage volume to good status on the second storage array, and transmitting an instruction from the second storage array to the first storage array to set the status of the first storage volume to good status on the first storage array, prior to responding, by the second storage array to the host, with the host storage volume status inquiry response including the good storage volume status.

9. A synchronous remote data replication facility, comprising:
a first storage array and a second storage array, the first and second storage arrays being synchronized and both the first and second storage arrays being read/write accessible to a host such that data written by the host to either of the first and second storage arrays is synchronized on the remote data replication facility to the other of the first and second storage arrays;
each of the first and second storage arrays including one or more processors and one or more storage devices storing instructions that are operable, when executed by the one or more processors, to cause the one or more processors to perform operations comprising:
receiving a request from the host, by the first storage array, to add a storage volume to the remote data replication facility;
locally creating a first storage volume on the first storage array and setting the first storage volume to be host inaccessible;
instructing the second storage array, by the first storage array, to add the storage volume to the remote data replication facility;
locally creating a second storage volume on the second storage array and setting the second storage volume to be host inaccessible;
formatting the first storage volume by the first storage array;
formatting the second storage volume by the second storage array;
coordinating response to host status inquiries, by the first storage array and second storage array, to not respond with a storage volume status good indication to the host, until both formatting of the first storage volume has completed on the first storage array and formatting of the second storage volume has completed on the second storage array;
receiving a first host storage volume status inquiry from the host by the first storage array;
determining a first formatting percentage completion value of the first storage volume on the first storage array;
transmitting a first storage volume status inquiry from the first storage array to the second storage array;
determining a second formatting percentage completion value of the second storage volume on the second storage array;
responding to the first storage volume status inquiry with the second formatting percentage completion value by the second storage array to the first storage array;

creating a determined completion value, by the first storage array, from the first formatting percentage completion value and second formatting percentage completion value; and responding, by the first storage array to the host, with a first host storage volume status inquiry response including the determined completion value.

10. The synchronous remote data replication facility of claim 9, wherein the determined completion value is a lesser of the first formatting percentage completion value of the first storage volume and the second formatting percentage completion value of the second storage volume.

11. The synchronous remote data replication facility of claim 9, wherein the determined completion value is an average of the first formatting percentage completion value of the first storage volume and the second formatting percentage completion value of the second storage volume.

12. The synchronous remote data replication facility of claim 9, wherein the first host storage volume status inquiry is a Small Computer System Interface (SCSI) Test Unit Ready command, and wherein the first host storage volume status inquiry response is a SCSI Format In Progress command.

13. The synchronous remote data replication facility of claim 9, the operations further comprising:
receiving a second host storage volume status inquiry from the host by the second storage array;
determining a third formatting percentage completion value of the second storage volume on the second storage array;
transmitting a second storage volume status inquiry from the second storage array to the first storage array;
determining a fourth formatting percentage completion value of the first storage volume on the first storage array;
responding to the second storage volume status inquiry with the fourth formatting percentage completion value by the first storage array to the second storage array;
creating a second determined completion value, by the second storage array, from the fourth formatting percentage completion value and the third formatting percentage completion value; and
responding, by the second storage array to the host, with a second host storage volume status inquiry response including the second determined completion value.

14. The synchronous remote data replication facility of claim 9, the operations further comprising:
receiving a second host storage volume status inquiry from the host by the first storage array;
determining that formatting of the first storage volume has been completed on the first storage array;
transmitting a second storage volume status inquiry from the first storage array to the second storage array;
determining that formatting of the second storage volume has been completed on the second storage array;
responding to the second storage volume status inquiry by the second storage array to the first storage array with an indication that formatting of the second storage volume has been completed on the second storage array; and
responding, by the first storage array to the host, with a second host storage volume status inquiry response including a storage volume good status.

15. The synchronous remote data replication facility of claim 14, the operations further comprising setting the first storage volume to good status on the first storage array, and transmitting an instruction from the first storage array to the second storage array to set the status of the second storage volume to good status on the second storage array, prior to responding, by the first storage array to the host, with the second host storage volume status inquiry response including the good storage volume status.

16. The synchronous remote data replication facility of claim 9, the operations further comprising:
receiving a second host storage volume status inquiry from the host by the second storage array;
determining that formatting of the second storage volume has been completed on the second storage array;
transmitting a second storage volume status inquiry from the second storage array to the first storage array;
determining that formatting of the first storage volume has been completed on the first storage array;
responding to the second storage volume status inquiry by the first storage array to the second storage array with an indication that formatting of the first storage volume has been completed on the first storage array; and
responding, by the second storage array to the host, with a second host storage volume status inquiry response including a storage volume good status.

17. The synchronous remote data replication facility of claim 16, the operations further comprising setting the second storage volume to good status on the second storage array, and transmitting an instruction from the second storage array to the first storage array to set the status of the first storage volume to good status on the first storage array, prior to responding, by the second storage array to the host, with the second host storage volume status inquiry response including the good storage volume status.

* * * * *